(12) United States Patent
Nakamura

(10) Patent No.: US 6,922,568 B1
(45) Date of Patent: Jul. 26, 2005

(54) COMMUNICATION SYSTEM AND METHOD CAPABLE OF FAVORABLY TRANSMITTING AN IMAGE OR A VOICE TO AN OBJECT DEVICE THROUGH A MOBILE STATION

(75) Inventor: Yoshitaka Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 990 days.

(21) Appl. No.: 09/606,358

(22) Filed: Jun. 29, 2000

(30) Foreign Application Priority Data

Jun. 30, 1999 (JP) .......... 11-184549

(51) Int. Cl.$^7$ .......... H04M 11/00
(52) U.S. Cl. .......... 455/462; 455/352; 455/518; 348/14.02; 725/74
(58) Field of Search .......... 455/352–353, 455/344, 555, 68, 3.03–3.06, 426.1, 423, 462, 465, 518, 41.2, 11.1, 550.1, 557, 420, 455; 348/14.02, 14.12; 725/74–76

(56) References Cited

U.S. PATENT DOCUMENTS

| | | | | |
|---|---|---|---|---|
| 5,060,296 A | * | 10/1991 | Grube et al. | 455/509 |
| 5,200,991 A | * | 4/1993 | Motoyanagi | 455/465 |
| 5,218,628 A | * | 6/1993 | Ito | 455/462 |
| 5,479,485 A | * | 12/1995 | Hayashi | 455/462 |
| 5,903,322 A | * | 5/1999 | Chen | 348/723 |
| 5,910,815 A | * | 6/1999 | Boursier et al. | 348/14.01 |
| 6,161,007 A | * | 12/2000 | McCutcheon et al. | 455/558 |
| 6,281,925 B1 | * | 8/2001 | Kosaka | 348/14.02 |
| 2001/0004598 A1 | * | 6/2001 | Sato | 455/445 |
| 2002/0173326 A1 | * | 11/2002 | Rosen et al. | 455/518 |

FOREIGN PATENT DOCUMENTS

| | | |
|---|---|---|
| GB | 2343341 A | 5/2000 |
| JP | 5-252106 | 9/1993 |
| JP | 8-102801 | 4/1996 |
| JP | 9-13013 | 5/1997 |
| JP | 10-28194 | 1/1998 |
| JP | 10-42363 | 2/1998 |
| JP | 10-84430 | 3/1998 |
| JP | 10-224859 | 8/1998 |
| JP | 10-257558 | 9/1998 |
| WO | WO99/48293 | 9/1999 |

* cited by examiner

*Primary Examiner*—Jean Gelin
*Assistant Examiner*—Kamran Afshar
(74) *Attorney, Agent, or Firm*—Scully, Scott, Murphy & Presser (57) ABSTRACT

In a communication system which has a base station, a mobile station and an object device controllable by the mobile station, the mobile station monitors status of the object device to detect whether or not the object device is ready to receive a data signal sequence sent through the mobile station. Such a data signal sequence may be either a voice data signal or an image data signal. The mobile station can transmit, towards the base station, a response determined by the status of the object device. A reception state of the object device may be switched from one to another to selectively receive the voice and the image data signals.

48 Claims, 8 Drawing Sheets

IMAGE DATA RECEPTION
(IMAGE TERMINAL IS PUT IN UNREADY STATE AND REQUIRES IMAGE DATA SIGNAL AFTER HOLDING OPERATION)

FIG. 11

| INFORMATION ELEMENT | INFORMATION LENGTH | CONTENT |
|---|---|---|
| DESTINATION ADDRESS | 1 | |
| ⊚ SOURCE ADDRESS | 1 | TEmID |
| LENGTH | 2 | |
| MESSAGE TYPE | 1 | |
| ⊚ CALL NUMBER | 1 | |
| OMITTED | | |

COMMUNICATION SYSTEM AND METHOD CAPABLE OF FAVORABLY TRANSMITTING AN IMAGE OR A VOICE TO AN OBJECT DEVICE THROUGH A MOBILE STATION

BACKGROUND OF THE INVENTION

This invention relates to a communication system, a communication method, a mobile station communicable with an object device, such as a video camera, a digital camera, and a computer-readable storage medium for use in the mobile station.

A mobile station, such as a mobile telephone or a portable telephone, was used only for voice communication through a base station. However, it has been a recent trend that data communication has also been realized by the use of such a mobile station. In order to establish the data communication by the use of a mobile station, a moving picture transmitter/receiver terminal (will be simply called a picture terminal hereinafter) has been developed and practically sold in a market. Such a picture terminal can be usually connected to the mobile station and can display, on a display unit, a moving picture sent from the base station through the mobile station. In any event, the picture terminal has been usually connected to the mobile station through physical connectors but might be connected to the mobile terminal through a wireless channel or through an infrared ray in the future. In this connection, the picture terminal will be called an object terminal that is operable as an object of the mobile station.

Herein, it is to be noted that a user or a possessor individually carries or bears the mobile station and the picture terminal and usually put them into operations independently of each other. This shows that, when the object terminal is called or accessed by the mobile station, the object terminal may not be always put into an active state and may not be always connected to the latter. Under the circumstances, when the moving picture is received by the mobile station, the user never knows that such a moving picture can not be received until the object device is taken out of his/her bag or the like. In other words, the user can not quickly confirm or make sure of status of the object device until the object device is taken out and the user recognizes the status of the object device. Accordingly, the user can not often receive or might uselessly lose the moving picture which is sent from the base station through the mobile station and which might be precious for the user.

Similar problems might occur even when the mobile station and the object device are connected to each other through a wireless channel or an infrared ray.

In Japanese Unexamined Patent Publication No. Hei 10-224859 (namely, JP-A 224859/1998) (will be referred to as Reference 1), description is made about data communication between mobile terminals or stations and an exchange. Specifically, it is assumed that one of the mobile stations is kept in an inactive state or an uncommunicable state when a sequence of data signal is transmitted from another mobile station. In this event, the data signal sequence is temporarily stored in an inside memory of the exchange. When the one mobile station is restored to a communicable state and makes sure of reception of the data signal sequence, a data transmission request is sent from the one mobile station to the exchange. In response to the data transmission request, the data signal sequence is transmitted from the inside memory of the exchange to the one mobile station. At any rate, the one mobile station can automatically access the exchange in the communicable state to receive the data signal sequence from the exchange.

In Japanese Unexamined Publication No. Hei 10-257558 (namely, JP-A 257558/1998) (will be referred to as Reference 2), description will be made about data communication between a main device and a subsidiary device. The main device includes a modem while the subsidiary device may be a personal computer. With this data communication, modem information is transmitted between the main and the subsidiary devices.

However, neither Reference 1 nor Reference 2 discloses data communication between a mobile station and an object device communicable with the mobile station.

SUMMARY OF THE INVENTION

It is an object of this invention to provide a communication system which is effective for communication between a mobile station and an object device which is used in combination with the mobile station.

It is another object of this invention to provide a communication system of the type described, which is capable of automatically and reasonably responding to an image data signal.

It is still another object of this invention to provide a communication system of the type described, which can prevent an image data signal from being undesirably lost.

It is yet another object of this invention to provide a mobile station and a computer-readable storage medium both of which can be effectively used in the communication system mentioned above.

A communication system to which this invention is applicable comprises a base station, a mobile station communicable with the base station through a radio channel, and an object device controllable by the radio channel. According to an aspect of this invention, the mobile station comprises a monitoring unit for monitoring status of the object device to produce a status signal representative of the status of the object device and a control unit, coupled to the monitoring unit, for responding to the base station through the radio channel on the basis of the status signal when the mobile station is called by the base station. In this event, the base station transmits an image to the mobile station in the form of a sequence of image data signals through the radio channel on calling the mobile station while the object device includes a display unit for visually displaying the image. Under the circumstances, the object device is controlled by the mobile station through a radio channel or through connectors. Alternatively, the object device is coupled to the mobile station through an infrared ray.

The control unit may respond to the base station by notifying the base station of rejection of the response when the monitoring unit detects that the object device is put in uncontrollable status.

According to another aspect of this invention, a method is for use in carrying out communication between a base station and a mobile station which is communicable with an object device. The method comprises the steps of monitoring status of the object device to produce a status signal representative of the status of the object device and responding to the base station through the radio channel on the basis of the status signal when the mobile station is called by the base station.

The responding step comprises the step of receiving the status signal from the object device and detecting the status of the object device to transmit the status of the object device to the base station.

More specifically, the responding step comprises the steps of receiving the image data signal sequence from the base station, carrying out an operation determined for reception of the image data signal sequence, and informing the base station of the result of the operation.

The informing step may comprise the step of transmitting, as the result of the operation, rejection of the response to the base station when detection is made in the monitoring step about the fact that the mobile station is not connected to the object device. Alternatively, the informing step may comprise the step of transmitting, as the result of the operation, admission of receiving only the voice to the base station. Furthermore, the informing step may comprise the steps of transmitting, to the base station, a holding response representative of a holding operation of the mobile station and checking whether or not a connection is established between the mobile station and the object device in response to a request for the image data signal. In addition, the informing step may further comprise the step of transmitting, as the result of the operation, a response to reception of the image data signal when the connection is established between the mobile station and the object device.

Alternatively, the informing step may comprise the step of transmitting, as the result of the operation, a rejection response representative of rejection of the response to the base station when the connection is not established between the mobile station and the object device or may comprise the step of transmitting, as the result of the operation, admission of receiving only the voice signal sequence when no connection is established between the mobile station and the object device.

According to still another aspect of this invention, a computer-readable storage medium is for use in storing a program used in a mobile station. The program comprises the steps of monitoring status of an object device to produce a status signal representative of the status of the object device and responding to the base station through the radio channel on the basis of the status signal when the mobile station is called by the base station.

DESCRIPTION OF THE PREFERRED EMBODIMENTS

Figure 1:
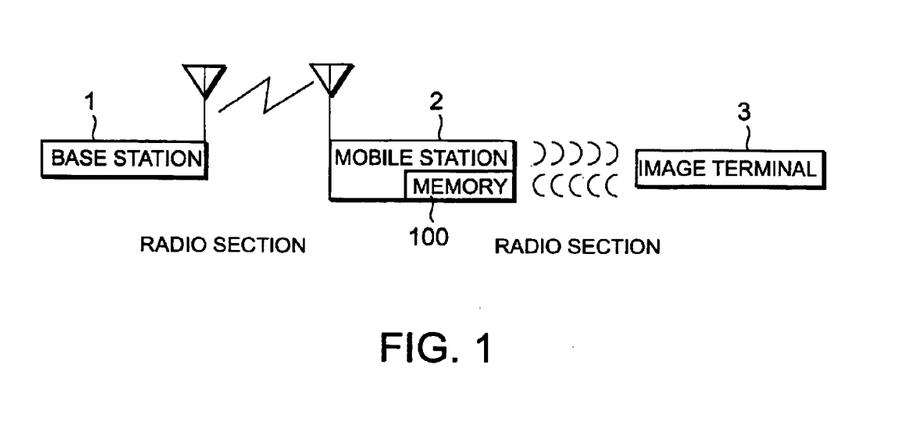
FIG. 1 schematically shows a communication system to which this invention is applicable.

Referring to FIG. 1, description will be schematically made about a communication system according to an embodiment of this invention. The illustrated communication system comprises a base station 1, a mobile terminal or station 2 communicable with the base station 1 through a radio channel, and an object device 3 communicable with and controllable by the mobile station 2. The object device 3 may be, for example, an image or video terminal, such as a digital camera, a digital video camera, a VCR, or the like. In the illustrated example, the image terminal 3 shown in FIG. 1 is assumed to be communicable with the mobile station 2 through a radio channel, although the object device 3 may be connected to the mobile station 2 through physical connectors or so.

In this connection, a radio section or spatial interval is left between the base station 1 and the mobile station 2 and between the mobile station 2 and the image terminal 3, as shown in FIG. 1.

The mobile station 2 periodically monitors status of the image terminal 3 and has an internal memory 100 for storing the status of the image terminal 3. As the status of the image terminal 3, the mobile station 2 may monitor whether or not the image terminal 3 is put into an active state, whether or not the image terminal 3 is communicable with the mobile station 2, and/or whether or not the image terminal 3 is connected to the mobile station 2. In this case, such status of the image terminal 3 may be stored as a connection information signal in the internal memory 100.

Now, let an incoming call be received by the mobile station 2 from the base station 1 together with a sequence of image data signals. Responsive to the call, the mobile station 2 checks the connection information signal stored in the internal memory 100 and transmits, to the base station 1, admission of the image data signals when a connection is established between the mobile station 2 and the image terminal 3.

On the other hand, the mobile station 2 automatically transmits, to the base station 1, a predetermined response which corresponds to the status of the image terminal 3, when the connection is not established between the mobile station 2 and the image terminal 3. The response may indicate rejection of the reception of the image data signals, holding the response, accepting only reception of a speech or voice signal, or the like. In this event, the user or possessor is notified of such a response that is sent to the base station 1. Therefore, the user can appropriately respond to the incoming call without checking the status of the image terminal 3, regardless of the status of the image terminal 3.

Figure 2:
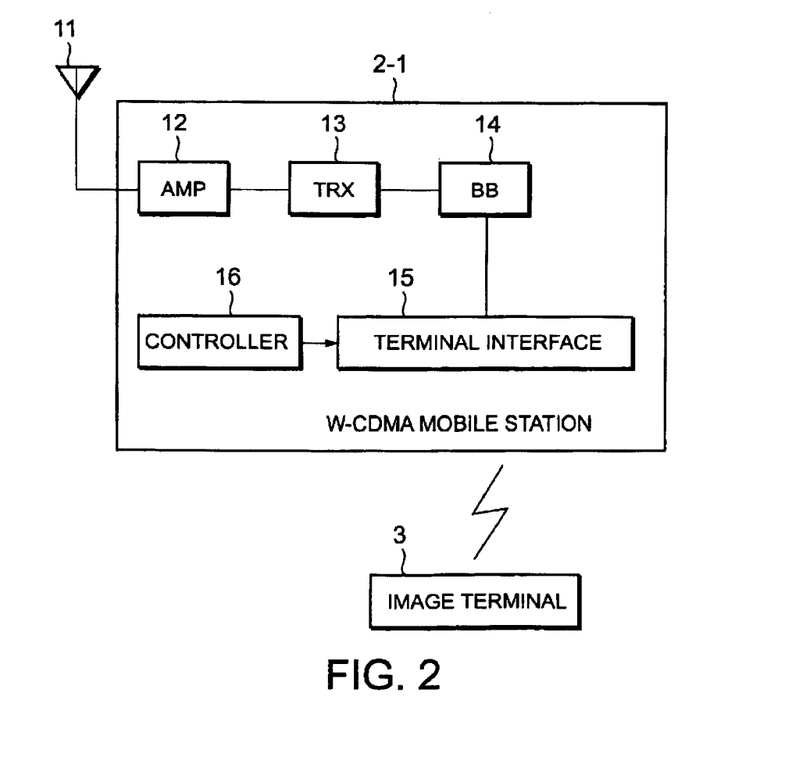
FIG. 2 conceptually shows a block diagram of a communication system according to this invention.

Referring to FIG. 2, description will be made on the assumption that a W-CDMA (Wideband-Code Division Multiple Access) system is used as the communication system illustrated in FIG. 1. In FIG. 2, the mobile station 2-1 alone is illustrated which is appropriate for the CDMA system and which comprises similar parts designated by like reference numerals. The illustrated mobile station depicted by 2-1 has an antenna 11, a transmitter/receiver amplifier (AMP) 12, a transmitter/receiver radio portion (TRX) 13, and a baseband processing portion (BB) 14. In addition, the baseband processing portion (BB) 14 is connected to a terminal interface 15 while the terminal interface 15 is operable as a communication port to be coupled to the image terminal 3. The illustrated elements 12 to 15 are all operable under control of a controller 16 which will be described in detail later.

Herein, operation of the mobile station 2-1 will be described below with reference to FIG. 2. A radio signal of a high frequency is received through the antenna 11 and is sent to the radio portion (TRX) 13 through the amplifier (AMP) 12. The received signal is subjected to quasi- or plesio-synchronous detection and thereafter to analog-to-digital (AND) conversion by the radio portion (TRX) 13 to be sent to the baseband processing portion 14.

As known in the art, the radio signal in the W-CDMA system is modulated by a spread spectrum technique and is therefore is despread by the baseband processing portion 14. Furthermore, the baseband processing portion 14 executes baseband processing peculiar to the W-CDMA. Such baseband processing may include chip synchronization, error correction code decoding, data multiplexing and demultiplexing, handover processing related to diversity reception, and the like. Inasmuch as such individual processing is known in the art, description will be omitted about the baseband processing from the instant specification.

In any event, the baseband processing portion 14 produces a processed signal representative of a result of the baseband processing mentioned above and delivers the processed signal to the image terminal 3 through the terminal interface 15 in a manner to be described later in detail.

Supplied with the processed signal, the image terminal 3 decodes the same into an image signal and a voice signal to produce an image and a voice corresponding to the image and the voice signals.

The above-mentioned operation is executed under control of the controller 16. In addition, the illustrated controller 16 controls not only the operation of the mobile station 2-1 but also controls a checking operation of the image terminal 3 and a responding operation to the base station 1 after the checking operation. It is needless to say that the status of the image terminal 3 is monitored by the controller 16 during the checking operation.

Figure 3:
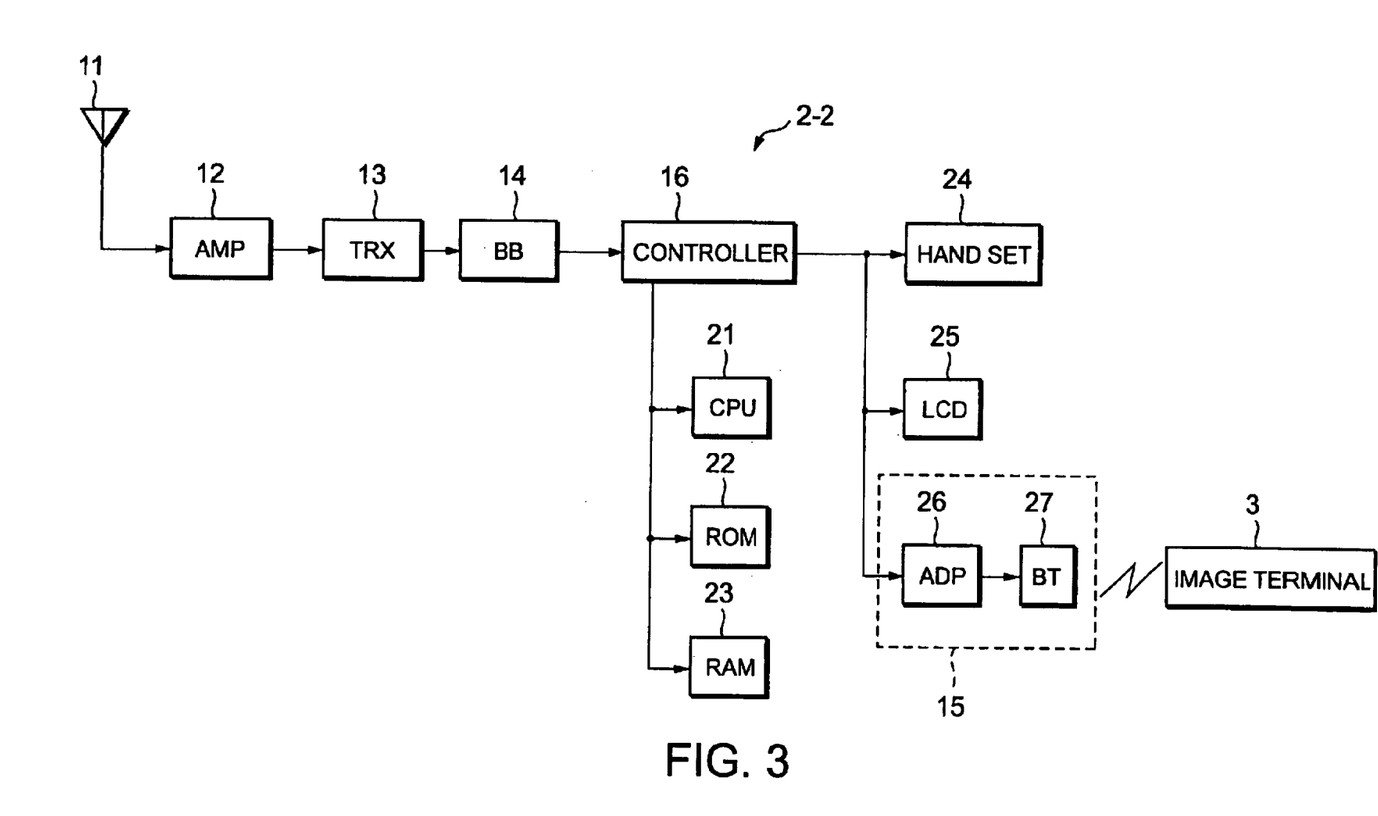
FIG. 3 shows a block diagram of a mobile station used in a communication system according to a first embodiment of this invention.

Referring to FIG. 3, a mobile station according to a first embodiment of this invention will be described in detail and comprises similar parts designated by like reference numerals in FIG. 2. Herein, it is surmised that the user possesses both the mobile station 2-2 and the image terminal 3 that can be operable by the user and that the mobile station 2-2 is communicable with both the base station and the image terminal 3 through a radio channel or a radio spatial interval, as illustrated in FIG. 1. Alternatively, the mobile station 2-2 can be connected to the image terminal 3 through connectors or lines, although description will be directed only to the radio communication between the mobile station 2-2 and the image terminal 3.

The radio communication between the mobile station 2-2 and the image terminal 3 may be executed in accordance with the Bluetooth technology or the IrDA (Infra-red Data Association) technology. As known in the art, the Bluetooth technology is prescribed to connect two terminal devices to each other by the use of a narrow band radio signal while the IrDA technology is prescribed for infrared ray communication. The Bluetooth technology is usually used for connections among a portable telephone, a printer, a PDA (Personal Digital Assistant), a personal computer, a facsimile device, a key board, a joystick, and so on.

In FIG. 3, the illustrated mobile station 2-2 has the antenna 11, the transmitter/receiver amplifier (AMP) 12, the radio portion (TRX) 13, the baseband processing portion (BB) 14, and the controller 16, like in FIG. 2. Furthermore, the mobile station 2-2 further has a central processing unit (CPU) 21, a read-only memory (ROM) 22, a random access memory (RAM) 22, a hand set 24, and a liquid crystal display (LCD) 25 all of which are connected to the controller 16 in a manner shown in FIG. 3.

Moreover, an automatic data processing unit (ADP) 26 and a Bluetooth unit (BT) 27 are connected to the controller 16 as the terminal interface 15 illustrated in FIG. 2.

Although detailed description will be omitted about the AMP 12, the TRX 13, the BB 14 because they are operable in the manner mentioned in conjunction with FIG. 2, operation of the controller 16 will be detailed later.

In FIG. 3, the CPU 21 is operable as a sub-controller of the controller 16, as will become clear as the description proceeds. The ROM 22 is operable as a computer-readable storage medium for storing a control program. The control program which is composed of a sequence of instructions monitors the status of the image terminal 3 in a manner to be described later.

The RAM 23 shown in FIG. 3 serves to store a status information signal representative of status of connection between the mobile device 2-2 and the image terminal 3. In addition, the hand set 24 is provided with a set of input keys, a microphone, a speaker, and so on. The LCD 25 displays a communication state and so forth while the ADP 26 is operable as a data communication adapter. The BT 27 carries out communication with the image terminal 3 in accordance with the Bluetooth technology.

Briefly, the mobile device 2-2 is specified by the controller 16 for periodically monitoring the image terminal 3 and the RAM 23 for periodically storing the status of the connection concerned with the image device 3.

Figure 4:
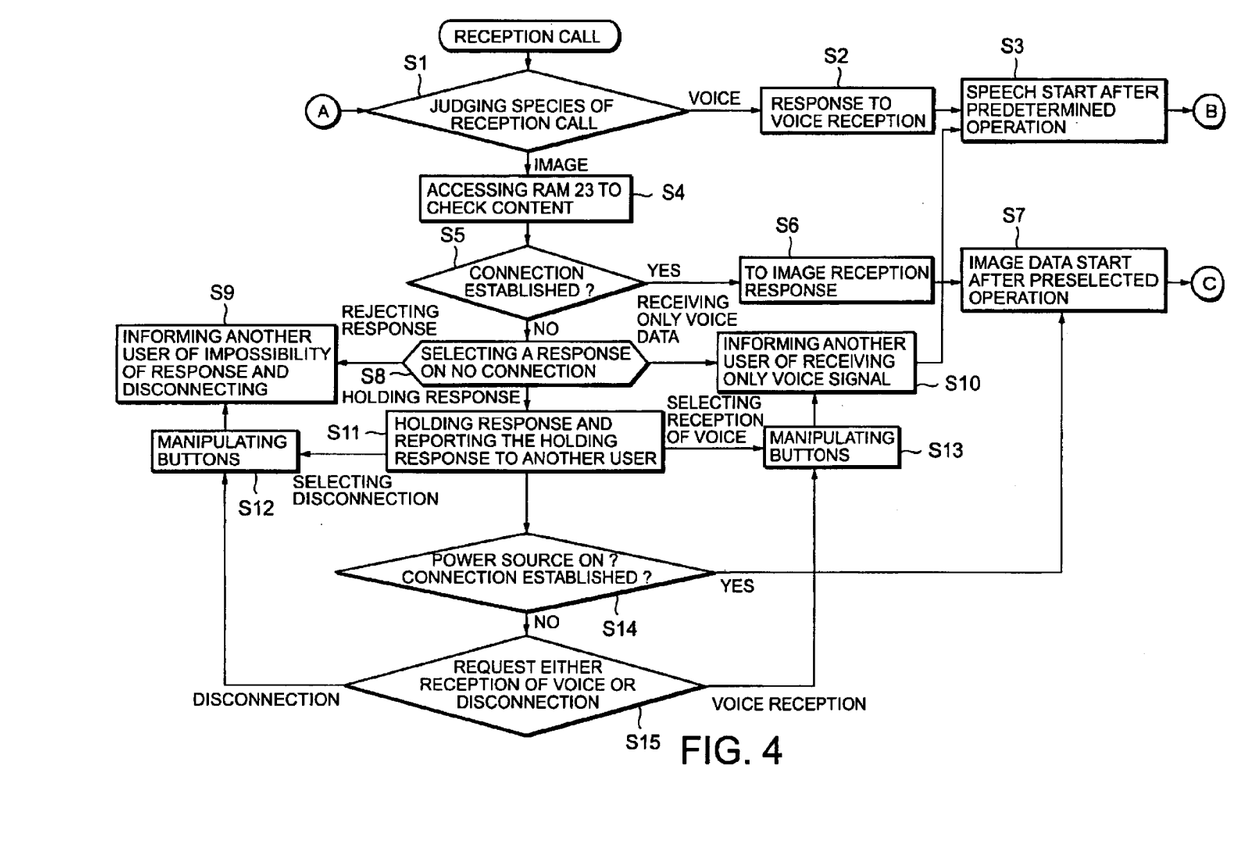
FIG. 4 shows a flow chart for use in describing a whole of operation of the mobile station illustrated in FIG. 3.

Referring to FIG. 4 together with FIGS. 5 through 11, the operation of the controller 16 will be described, taking the above into consideration. The controller 16 is operated in accordance with a flow chart illustrated in FIG. 4 while the communication system is operated in accordance with time charts illustrated in FIGS. 5 to 11.

Figure 5:
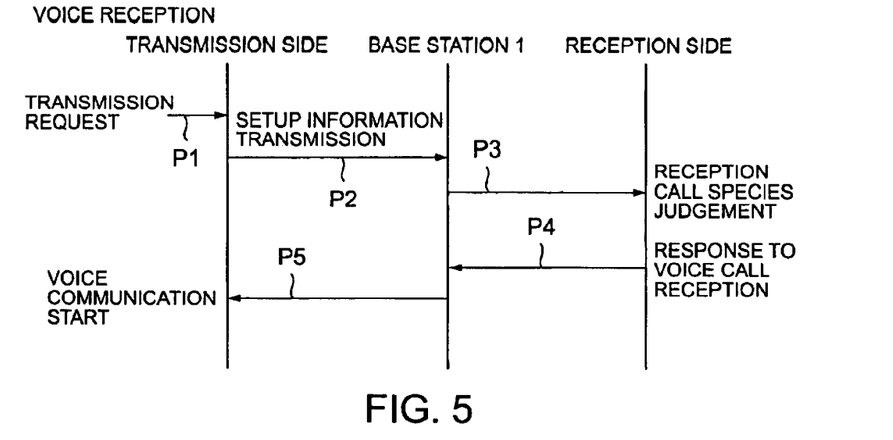
FIG. 5 shows a time chart for use in describing an operation of the mobile station illustrated in FIG. 3.

In FIG. 5, a transmission request P1 is given to a transmission side connected to the base station 1 and is transferred from the base station 1 to the mobile station 2-2 which is operable as a reception side.

Herein, it is assumed in FIG. 5 that the transmission request P1 is issued by a transmission terminal device (not shown), such as a mobile station, a usual telephone, or the like, and requires voice communication that includes no image data signal. In this event, the transmission terminal device transmits a setup information signal P2 to the base station 1. Responsive to the setup information signal P2, the base station 1 transfers, to the reception side (the mobile station 2-2), a reception species signal representative of a species of the transmission request P1, namely, a reception call received by the mobile station 2-2.

Supplied with the reception species signal P3, the mobile station 2-2 is operated in the manner illustrated in FIG. 4. In FIG. 4, the mobile station 2-2 judges at a step S1 whether the species of the reception species signal P3 is a voice or an image. Since the species of the reception call specifies the voice in the illustrated example, the step S1 (FIG. 4) is followed by a step S2.

At the step S2, the mobile station 2-2 supplies the base station 1 with a response determined for the voice reception, namely, a voice reception response, as shown by P4 in FIG. 5.

The base station 1 informs the transmission side of admission of the voice reception by the mobile station 2-2 in a predetermined manner, such as transmitting a ringing tone (P5 in FIG. 5).

The user who possesses or bears the mobile station 2-2 knows about the reception call to the mobile station 2-2 and takes it out of his/her bag or so. When judgement is made about the voice reception call, the user admits the voice reception call by a predetermined operation and starts a speech or conversation with the transmission side (step S3 in FIG. 4).

Figure 6:
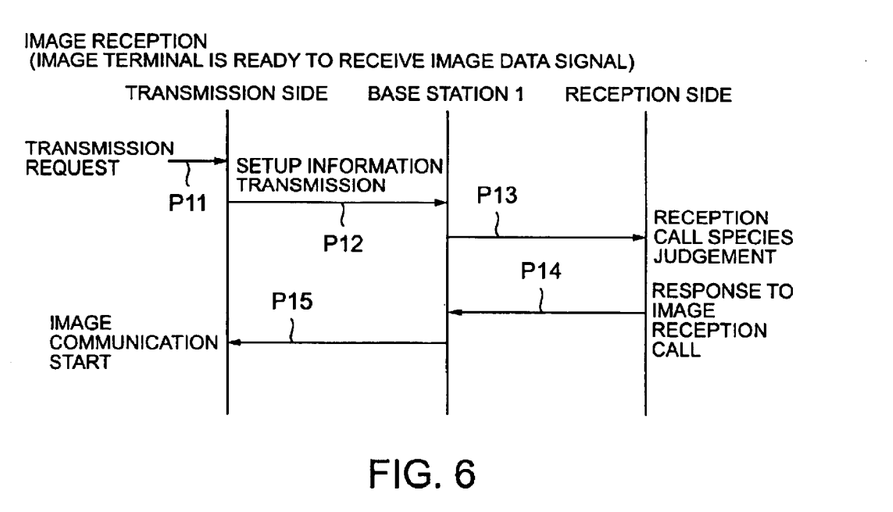
FIG. 6 shows another time chart for use in describing another operation of the mobile station.

Referring to FIG. 6 together with FIG. 4, description will be made about an operation that is carried out in the mobile station 2-2 when the image terminal 3 can be ready to receive an image data signal sequence. In other words, it may be said that the mobile station 2-2 is put into a ready state. In FIG. 6, an image transmission request P11 for image transmission is given from another user or subscriber (not shown) to a transmission side. Responsive to the image transmission request P11, the transmission side delivers a setup information signal to the base station 1, as depicted by P12 in FIG. 6. The base station 1 sends the reception side, namely, the mobile station 2-2 a species signal P13 representative of transmission of an image signal.

Referring back to FIG. 4, the mobile station 2-2 at first detects the species signal and decides the species of a reception signal given as a reception call signal from the base station 1 (step S1 in FIG. 4). Inasmuch as the image signal sequence is sent from the base station 1 to the mobile station 2-2 in the illustrated example, the mobile station 2-2 detects the image signal reception from the species signal and accesses the RAM 23.

As mentioned in conjunction with FIG. 2, the RAM 23 periodically stores a status information signal representative of the status of connection between the mobile station 2-2 and the image terminal 3 under control of the controller.

Under the circumstances, the controller makes sure of the status of the connection at a step S4 and judges whether or not the connection is established between the mobile station 2-2 and the image terminal 3 at a step S5. When the connection is established between the mobile station 2-2 and the image terminal 3, the step S5 is followed by a step S6 at which a response to the image reception signal is issued from the mobile station 2-2 to the base station 1, as shown by P14 in FIG. 6. Such a response to the image signal is transmitted to another subscriber or calling party through the transmission side in a known manner (P15 in FIG. 6).

On the other hand, the user on the reception side (the mobile station 2-2) knows the image signal reception and takes the image terminal 3 out of his/her bag or so. Subsequently, the user admits the image signal reception in a predetermined manner and starts receiving the image signal sequence sent from another subscriber at a step S7.

When it is judged at the step S5 that the connection for the image signal reception is not established between the mobile station 2-2 and the image terminal 3, the step S5 is succeeded by a step S8 at which judgement is made about whether or not a response to the image signal reception call is issued from the mobile station 2-2.

Figure 7:
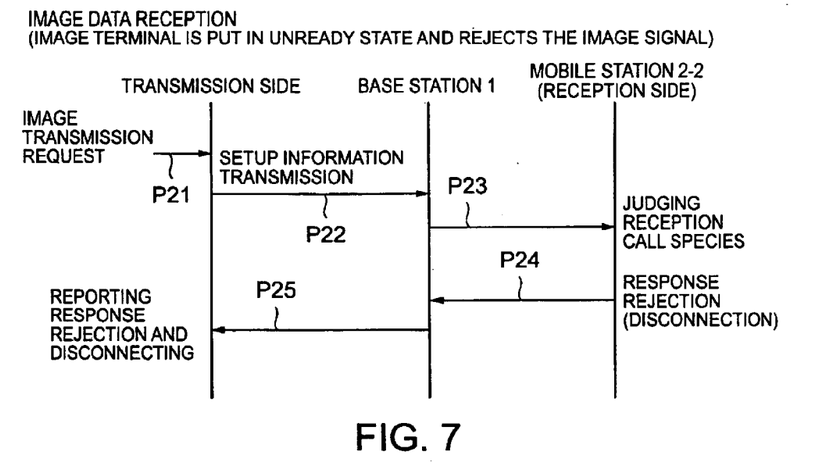
FIG. 7 shows a time chart for use in describing an operation of the mobile station that is executed in relation to status of an object device.

In FIG. 7, description is made about processing which is carried out when the rejection of the response is decided at the step S8. In this case, it may be said that the image terminal is not ready to receive the image data signal and that the status of the image terminal 3 is called an unready state of receiving the image data signal.

As shown in FIG. 7, an image transmission request for the image data transmission is given from a subscriber to the transmission side (P21) which may be another mobile station, abase station, or an exchange. The transmission side transmits the setup information signal to the base station 1, as depicted by P22 in FIG. 7. Responsive to the setup information signal, the base station 1 detects the image transmission request and sends the mobile station 2-2 a species signal representative of the reception species (P23 in FIG. 7). In the illustrated example, the species signal for the image transmission request or the image data signal is delivered from the base station 1 to the mobile station 2-2.

Temporarily referring back to FIG. 4, the mobile station 2-2 receives the species signal and makes sure of the species of the transmission request from the species signal at the step S1. When the species signal is indicative of reception of the image data signal, the step S1 is succeeded by the step S4 at which the status of the image terminal 3 is monitored by accessing the RAM 23. As mentioned before, the RAM 23 periodically stores the status of the connection between the mobile station 2-2 and the image terminal 3.

After the RAM 23 is accessed to monitor the status of the connection between the mobile station 2-2 and the image terminal 3, the step S4 is followed by a step S5 to determine whether or not the connection is established between the mobile station 2-2 and the image terminal 3. Since no connection is established in the illustrated example, the step S5 is followed by a step S8 at which selection is made about a response which is sent from the mobile station 2-2 when no connection is established between the mobile station 2-2 and the image terminal 3.

In the illustrated example, three options are prepared as the response which is sent from the mobile station 2-2 when no connection is established, as readily understood from the step S8 in FIG. 4. Specifically, a first one of the responses is for rejecting reception of the image data signal while a second one of the responses is for holding or postponing reception of the image data signal. In addition, a third one of the responses is for receiving only a voice data signal without any image data signal.

In FIG. 7, the user is assumed to select the first response to reject the reception of the image data signal that is to be received in response to the image transmission request. In this event, the step S8 is succeeded by a step S9 at which the mobile station 2-2 rejects the reception of the image data signal. Specifically, the user informs another user of impossibility of the image data reception and of disconnection of the mobile station 2-2 from the transmission side. Thereafter, the mobile station 2-2 is disconnected from the transmission side by transferring a disconnection request from the mobile station 2-2 to the transmission side, as shown by P24 and P25 in FIG. 7.

Figure 8:
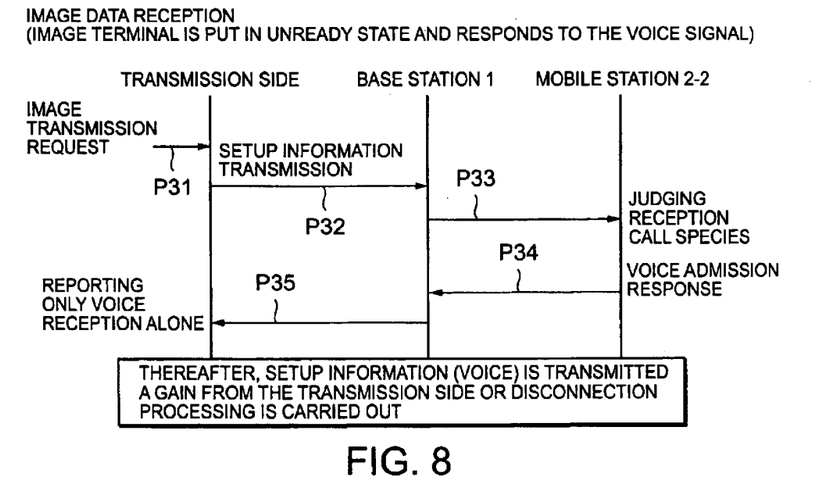
FIG. 8 shows another time chart for use in describing an operation of the mobile station concerned with another status of the object device.

In FIG. 8, the mobile station 2-2 is put into the unready state when the image transmission request is given from the transmission side. In addition, it is assumed that the user possessed of the mobile station 2-2 and the image terminal 3 wants to receive only the voice signal. Like in FIG. 7, the image transmission request is given to the transmission side and is transmitted from the transmission side to the base station 1 in the form of the setup information (P32 in FIG.

8). The base station 1 transfers the species signal representative of the image data transmission to the mobile station 2-2. Such a species signal is received by the mobile station 2-2 as a reception call species signal representative of a reception call species (P33 in FIG. 8).

Referring back to FIG. 4, the RAM 23 is accessed and monitored by the controller 16 in the mobile station 2-2 at the step S4. When the controller 16 knows at the step S5 that no connection is established between the mobile station 2-2 and the image terminal 3, the step S5 is followed by the step S8. The illustrated step S8 proceeds to a step S10 because the user wants to receive only the voice data signal in the illustrated example. At the step S10, the mobile station 2-2 informs another user that it can receive only the voice data signal. Thereafter, the step S10 is succeeded by the step S3 to start a speech between the user and another user after the predetermined operation.

More specifically, the mobile station 2-2 transfers, to the base station 1, a voice admission response which is indicative of admission or acceptance of receiving only the voice data signal, as shown by P34 in FIG. 34. Such a voice admission response is transferred from the base station 1 to the transmission terminal and is reported to another user (P35) about receiving only the voice data signal.

Thereafter, the setup information is sent from the transmission side in the form of a voice to the mobile station 2-2 in the above-mentioned manner or disconnection processing is carried out by the transmission side, the mobile station 2-2, and the base station 1 after a preselected time interval lapses.

Figure 9:
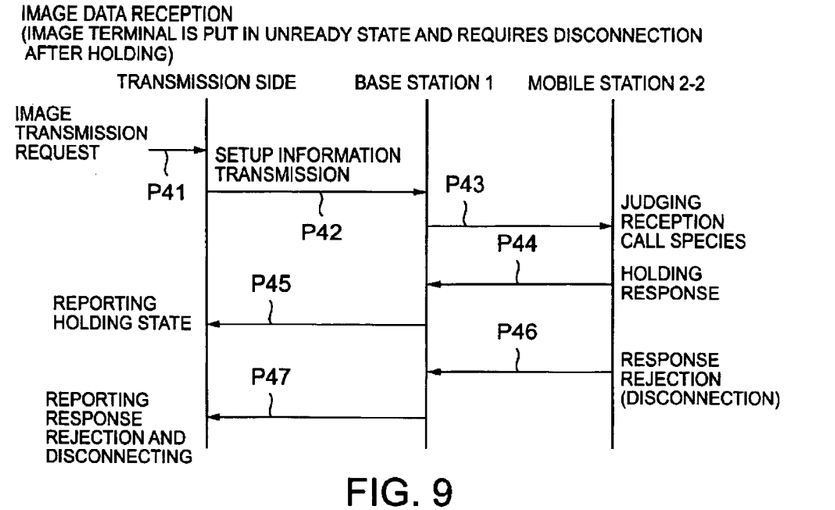
FIG. 9 shows still another time chart for use in describing still another operation of the mobile station related to status of the object device.

In FIG. 9, operation will be described about the case where the mobile station 2-2 is put in an unready state disconnected from the image terminal 3 used for receiving the image data signal. Herein, it is surmised that the mobile station 2-2 holds a response to the image transmission request for a while and thereafter rejects the above request. In this case, the image transmission request P41 is given from the transmission side and transferred to the base station 1 as the setup information (P42). The base station 1 transmits the species signal to the mobile station 2-2 as shown by P43 in FIG. 9.

The mobile station 2-2 judges that the species signal is indicative of the image transmission request at the step S1 in FIG. 4 in the above-mentioned manner. In the mobile station 2-2, the controller 16 monitors the status of the connection between the mobile terminal 2-2 and the image terminal 3 by accessing the RAM 23 at the step S4. When no connection is established between the mobile station 2-2 and the image terminal 3, the steps S5 and S8 are successively executed in the above-mentioned manner under control of the controller 16.

Inasmuch as the user wants to hold the response at the step S8 in the example illustrated in FIG. 9, the step S8 is followed by a step S11 in FIG. 4. At the step S11, the mobile station 2-2 holds a response (holding response)to the image transmission request and reports the holding response to another user. The holding response is sent from the mobile station 2-2, as shown by P44 and transferred from the base station 1 to the transmission terminal (P45).

Within a holding time interval, the user determines whether or not the image transmission data signal can be received by the image terminal 3. Since the user selects the disconnection or no-reception of the image data signal in the illustrated example, the step S11 proceeds to a step S12 in FIG. 4. At the step S12, the user operates or manipulates buttons arranged on the hand set 24 illustrated in FIG. 3 and indicates the disconnection of the mobile station 2-2 from the transmission side.

As a result, the step S9 in FIG. 4 is executed to inform another user of impossibility of response to the image transmission request and to disconnect the mobile station 2-2 from the transmission side.

As shown in FIG. 9, a response of rejecting reception of the image transmission data signal is sent from the mobile station 2-2 to the base station 1 (P46) and is thereafter transferred from the base station 1 to the transmission side (P47). The response related to the disconnection is also sent from the mobile station 2-2 to the transmission side in the above-mentioned manner. Consequently, the mobile station 2-2 is disconnected from the transmission side.

Figure 10:
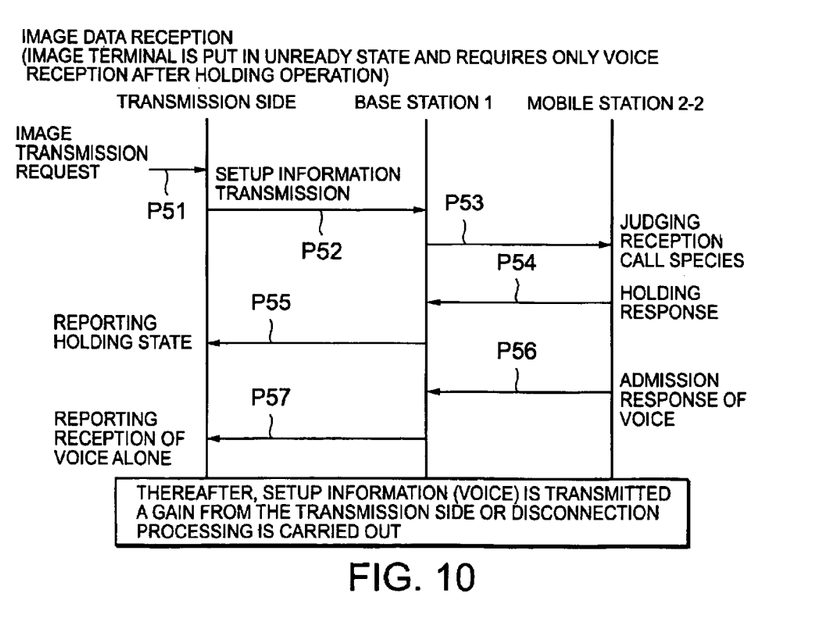
FIG. 10 shows yet another time chart for use in describing operation carried out when the object device is put into another status.

In FIG. 10 along with FIG. 4, description will be made on the assumption that the mobile station 2-2 is put into an unready state of receiving the image transmission data signal and requires reception of the voice signal alone after it is put in a holding state. As shown in FIG. 10, the transmission side is given the image transmission request 51 and is transmitted as the setup information to the base station 1 (P52). Subsequently, the species signal is delivered from the base station 1 to the mobile station 2-2 and specifies the image data transmission in this example, Referring back to FIG. 4 again, the controller 16 in the mobile station 2-2 executes the steps S1, S4, S5, S8, and S11 in a manner similar to those illustrated in FIGS. 4 and 9. In the example shown in FIG. 10, the mobile station 2-2 judges the reception of the image data signal (P53) and supplies the base station 1 with a holding response (P53) to be put into a holding state for a while, like in FIG. 9. Thereafter, the mobile station 2-2 detects that the user or possessor requires to receive the voice data signal alone without any image transmission data signal at the step S11 in FIG. 4.

In this event, the step S11 is followed by a step S13 at which the buttons of the hand set 24 are manipulated to inform another user of receiving only the voice data signal at the step S10. When the buttons are manipulated by the user at the step S13, the mobile station 2-2 transmits an admission response of the voice to the base station 1, as depicted by P56 in FIG. 10, and thereafter to the transmission side, as shown by P57. The transmission side reports to another user that the mobile station 2-2 requires reception of only the voice data signal. As a result, the voice or speech signal alone is transmitted from the transmission side to the mobile station 2-2 through the base station 1. Thereafter, similar operation is carried out in a manner similar to that mentioned in conjunction with FIG. 8.

Figure 11:
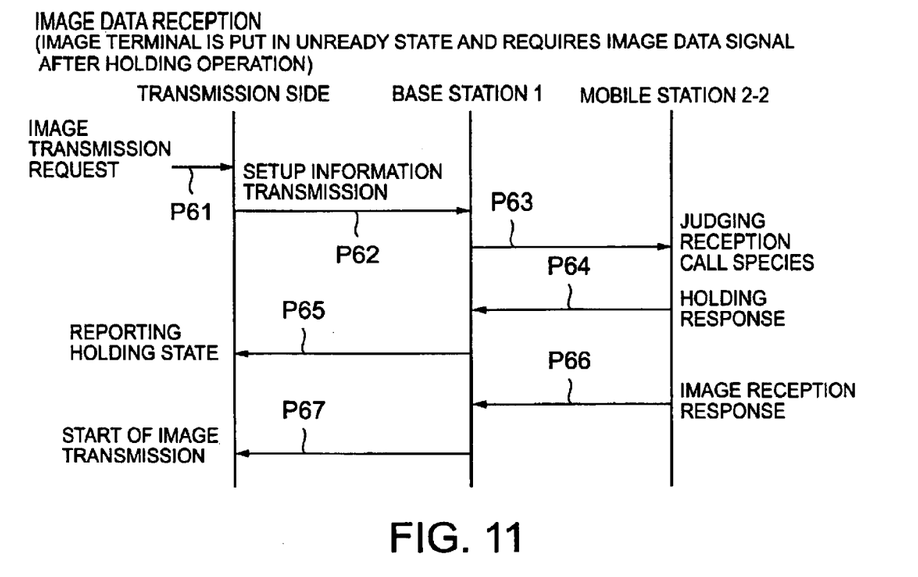
FIG. 11 shows another time chart for use in describing operation of the mobile station carried out in relation to the object device.

Referring to FIGS. 11 and 4, operation will be made about the case where image transmission is carried out from the transmission side after a holding operation is required by the mobile station 2-2. In FIG. 11, the image transmission request P61 is given to the transmission side and is delivered to the base station 1 as the setup information to be sent to the mobile station 2-2 as the species signal (P63).

Responsive to the species signal representative of the image data transmission, the mobile station 2-2 executes the steps 1, 4, 5, and 8 in a manner similar to that illustrated in FIG. 10. At the step S11, the mobile station 2-2 detects under control of the controller 16 (FIG. 3) that the image data transmission is requested or selected by the user after a holding time interval lapses. Under the circumstances, a step S14 follows the step S11 to check whether or not a power source in the image terminal 3 is turned on and whether or not the connection is established between the mobile station 2-2 and the image terminal 3. Such operation is carried out under control of the controller 16.

When the connection is established between the mobile station 2-2 and the image terminal 3(S14: Yes), the step S14 is succeeded by the step S7 to transmit the image transmission request to the base station 1 (P66) and thereafter to the transmission terminal (P67).

On the other hand, when it is judged at the step S15 that the connection is not established between the mobile station 2-2 and the image terminal 3 (S14:No), the step S14 is followed by a step S15 at which judgement is made about whether the user requests either reception of a voice data signal alone or disconnection from the transmission side. If the voice reception request is given from the user, the step S15 is succeeded by the step S13 to indicate manipulation of the buttons. As a result, the voice data signal is transmitted from the transmission side to the mobile station 2-2 in the abovementioned manner. If the disconnection request is issued from the user, the step S12 is executed after the step S15 to disconnect the mobile station 2-2 from the transmission terminal.

Herein, description will be directed to the judging step S1 shown in FIG. 4. As mentioned before, the judging step S1 is for judging either the voice data signal or the image data signal from the species signal. Therefore, the following description is made about how the voice data signal is distinguished from the image data signal.

Practically, a control signal is generally transmitted and received through a control channel between mobile stations prior to transmission and reception of user data signals, such as the voice data signals and the image data signals. Such a control signal is transferred through a base station between the mobile stations. The control signal includes a terminal number (which will be generally referred to as TEmID (Terminal Equipment IDentity) and a call number which. corresponds to the terminal number. Such a TEmID can define either the voice data signals or the image data signals. In other words, the transmission side generates a TEmID for transmission of the voice data signals on transmitting the voice data signals and generates another TEmID for transmission of the image data signals on transmitting the image data signals.

Therefore, it is possible to distinguish between the voice data signal and the image data signal with reference to both the terminal number and the call number.

In the above-mentioned embodiment, the control signal may be made to correspond to the setup information transmitted from the transmission side to the base station 1 (illustrated in FIGS. 7 through 11). This shows that the voice data signals and the image data signals can be distinguished from each other by monitoring the TEmID.

More specifically, it has been considered that the TEmID is assigned to each function of the mobile stations and to each of the image terminals. In addition, the call number is a peculiar number allocated to a logical channel used for transmitting the user data signals.

Figure 12:
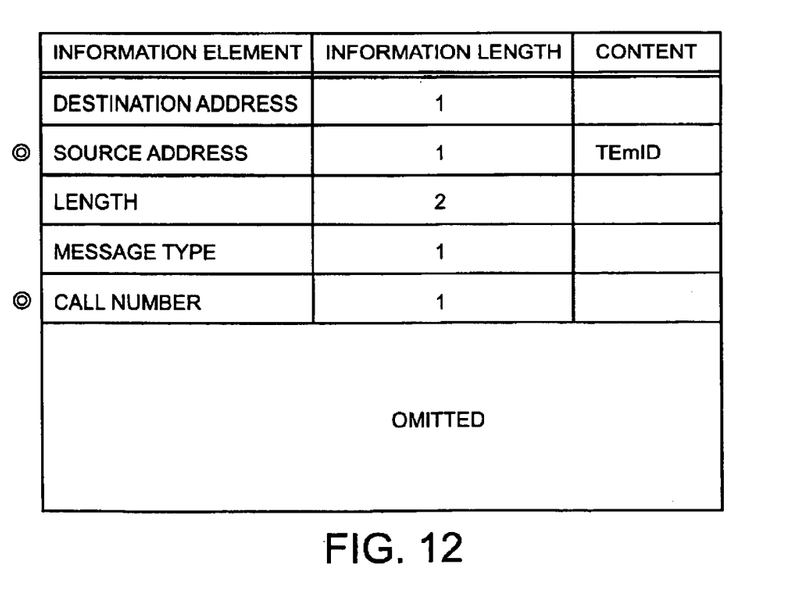
FIG. 12 shows a table for describing a control signal used in the communication system according to the first embodiment of this invention.

Referring to FIG. 12, the setup information will be described which may be used as the control signal mentioned above and which serves to distinguish between the voice and the image data signals. As shown in FIG. 12, the illustrated setup information includes destination address information, a source address information, length information, message type information, call number information, and the other information elements omitted from FIG. 12. The length information alone has two information lengths while the remaining information has a single information length. The contents of the source address information is represented by the TEmID.

According to the first embodiment mentioned above, the mobile station 2 periodically monitors the status of the connection between the mobile station 2 and the image terminal 3 and stores the status information into the RAM. When the image data signals are received by the mobile station, the RAM is checked to select the response in accordance with the status of the image terminal. With this structure, it is possible to change the species of the responses from one to another in consideration of the status of the image terminal.

Figure 13:
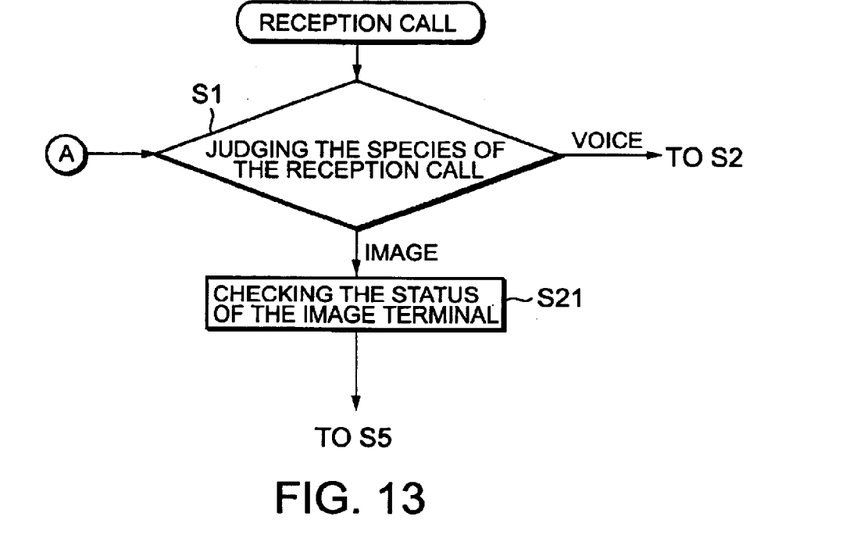
FIG. 13 shows a flow chart for describing an operation of a mobile station used in a communication system according to a second embodiment of this invention.

Referring to FIG. 13, a mobile station is for use in a communication system according to a second embodiment of this invention and is operable in accordance with a flow chart which is illustrated in FIG. 13 and which is partially modified from FIG. 4. As readily understood from FIG. 13, the species of the reception call is judged at the step S1 like in FIG. 4 but is followed by a step S21 at which the status of the image terminal 3 is directly checked by accessing the image terminal each time when the image transmission request is given to the mobile station. In other words, the status of connection is not periodically checked between the mobile station and the image terminal in the second embodiment. In this connection, the step S2 illustrated in FIG. 4 is not executed in the second embodiment.

Any other operations are similar to those illustrated in FIG. 4 and will not be therefore described any longer. With the mobile station according to the second embodiment, it is possible to reduce costs because the mobile station dispenses with an RAM and with periodically monitoring operation of the RAM.

Figure 14:
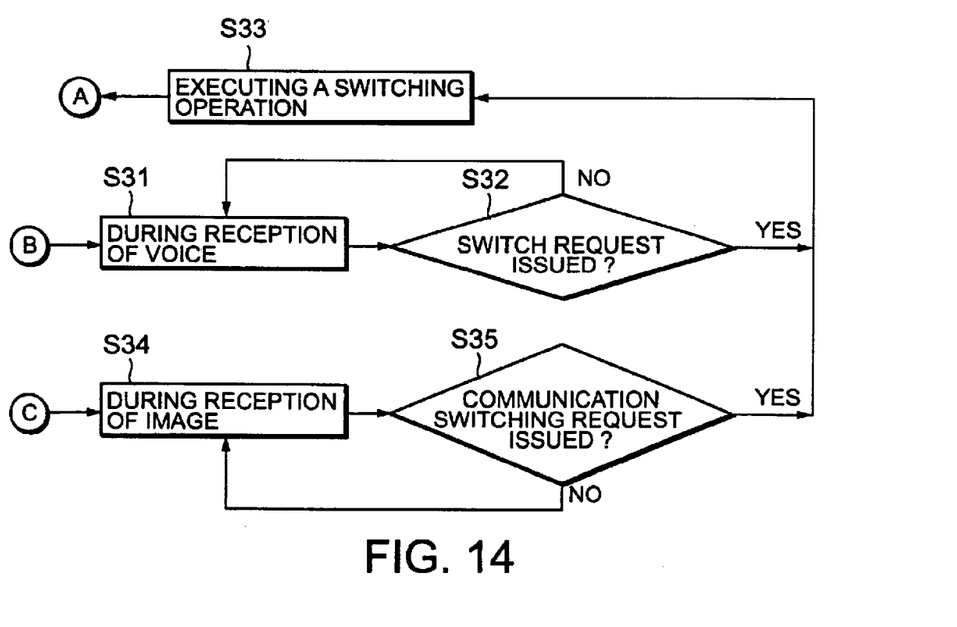
FIG. 14 shows a flow chart for describing an operation of a mobile station used in a communication system according to a third embodiment of this invention.

Referring to FIG. 14, description will be made about operation of a mobile station which is used for a communication system according to a third embodiment of this invention. The illustrated mobile station is operated in accordance with a flow chart shown in FIG. 14. More specifically, the mobile station makes it possible to switch from either the voice data or the image data to another after either the voice or the image begins to be received by the mobile station.

It is to be noted that such switching is not described in conjunction with the first embodiment illustrated in FIG. 4.

The terminals A, B, and C in FIG. 14 are common to those illustrated in FIG. 14 and a step S31 is executed after the step S3 shown in FIG. 4. When the speech or communication is started at the step S3 after the predetermined operation, the step S3 (FIG. 4) proceeds to the step S31 at which the speech is being continued between the users or the voice data sequence is being received. During the speech or communication (step S31), the controller 16 judges at a step S32 whether or not a switch request is issued by the user. Such a switch request requires switching the reception of a voice signal to the reception of an image signal. When the switch request is issued by the user (step S32:Yes), the step S32 is followed by a step S33 to execute a predetermined switching operation and operation is returned back to the step S1 illustrated in FIG. 4 to judge the species of the reception call. Otherwise, processing is returned back to the step S31.

On the other hand, when the image data signal is received by executing the step S7 (FIG. 4), the step S7 is followed through the terminal C by a step S34 in FIG. 14 to monitor reception of the image data signal sequence. During the reception of the image data signal sequence, the controller 16 judges at a step S35 whether or not a communication switch request is issued by the user. Such a communication switch request requires switching the reception of the image data signal to the voice data signal.

When the communication switch request is given from the user (step S35:Yes), the step S33 is executed after the step S35 to switch from the reception of the image data signal to the reception of the voice data signal. Otherwise (step S35:No), the image data signal is continuously being received at the step S34.

While this invention has thus far been described in conjunction with a few embodiments thereof, it will readily be possible for those skilled in the art to put this invention into practice in various other manners. For example, the mobile station may be connected to the image terminal or object device through lines or wiring instead of the radio channel. In this case, the object device may be integrated with the mobile station and may be directly connected to the latter inside.

Anyway, the mobile station can automatically transmit the status of the object device communicable with the mobile station and a user can appropriately respond to a reception call destined to the mobile station, without considering status of the object device. In addition, the object device monitored by the mobile station may be, for example, any other electric device than the image device. Moreover, it is possible to switch the states of the object device from one to another by using the mobile station.

What is claimed is:

1. A communication system which comprises a base station, a mobile station communicable with the base station through a radio channel, and an object device controllable by the radio channel, the mobile station comprising:

a monitoring unit for monitoring status of the object device to produce a status signal representative of the status of the object device; and a control unit, coupled to the monitoring unit, for responding to the base station through the radio channel on the basis of the status signal when the mobile station is called by the base station;

Wherein the status signal indicates one or more of the following: whether the object device is in an active state, whether the object device is communicable with the mobile station, and whether the object device is connected to the mobile station.

2. A communication system as claimed in claim 1, wherein the base station transmits an image to the mobile station in the form of a sequence of image data signals through the radio channel on calling the mobile station.

3. A communication system as claimed in claim 2, wherein the object device includes a display unit for visually displaying the image.

4. A communication system as claimed in claim 3, wherein the object device is controlled by the mobile station through a radio channel.

5. A communication system as claimed in claim 3, wherein the object device is coupled to the mobile station through an infrared ray.

6. A communication system as claimed in claim 1, wherein the control unit responds to the base station by notifying the base station of rejection of the response when the monitoring unit detects that the object device is put in uncontrollable status.

7. A communication system as claimed in claim 1, wherein the base station transmits both a voice and an image to the mobile station in the form of voice and image data signal sequences, respectively, through the radio channel on calling the mobile station.

8. A communication system as claimed in claim 7, wherein the control unit notifies the base station of status of receiving only the voice signal sequence when the monitoring unit detects that the object device is put into uncontrollable status.

9. A communication system as claimed in claim 1, wherein the control unit notifies the base station of holding a response when the monitoring unit detects that the object device is put into uncontrollable status.

10. A communication system as claimed in claim 9, wherein the control unit notifies the base station of rejection of a response after the notification of holding the response.

11. A communication system as claimed in claim 9, the base station transmitting both a voice and an image to the mobile station in the form of voice and image data signal sequences, respectively, through the radio channel on calling the mobile station, wherein the control unit notifies the base station of receiving only the voice signal sequence after the notification of holding the response.

12. A communication system as claimed in claim 11, wherein the control unit checks whether or not connection to the object device is established after the notification of holding the response.

13. A communication system as claimed in claim 12, wherein the control unit notifies the base station of receiving the image data signal sequence after the connection to the object device is established.

14. A communication system as claimed in claim 12, wherein the control unit notifies the base station of rejection of the response when the connection to the object device is not established.

15. A communication system as claimed in claim 9, the base station transmitting both a voice and an image to the mobile station in the form of voice and image data signal sequences, respectively, through the radio channel on calling the mobile station, wherein the control unit notifies the base station of receiving only a voice data signal sequence when the connection is not established.

16. A communication system as claimed in claim 7, wherein the control unit transmits, to the base station, a notification of receiving the image data signal sequence when the monitoring unit detects that the object device is put into a controllable state.

17. A communication system as claimed in claim 1, wherein the monitoring unit comprises a device monitor for periodically monitoring the status of the object device to produce a status information signal representative of the status of the object device and a memory portion for memorizing the status information signal;

the control unit comprising:

a transmission element coupled to the memory portion for responding to the base station on the basis of the status information signal.

18. A communication system as claimed in claim 17, wherein the status information signal represents the status of connection between the mobile station and the object device.

19. A communication system as claimed in claim 1, wherein the monitoring unit monitors the status of the object device only when a call is received from the base station.

20. A communication system as claimed in claim 19, wherein the monitoring unit monitors, as the status of the object device, whether or not the object device is connected to the mobile station.

21. A communication system as claimed in claim 1, wherein the control unit responds to the base station by notifying it of receiving a voice when a voice call is received from the base station by the mobile station.

22. A communication system as claimed in claim 1, the base station transmitting both a voice and an image to the mobile station in the form of voice and image data signal sequences, respectively, through the radio channel on calling the mobile station, wherein the control unit comprises a detecting element for detecting a species signal representative of either one of the voice and the image data signal sequences.

23. A communication system as claimed in claim 22, wherein the control unit further comprises:
   a switching element for switching from either one of the voice and the image data signal sequences to another one on the basis of the species signal detected by the detecting element.

24. A communication system as claimed in claim 22, wherein the detecting element detects, as the species signal, a TEmID included in a control signal arranged in a control channel.

25. A mobile station for use in a communication system which comprises a base station communicable with the mobile station through a radio channel and an object device controllable by the radio channel, the mobile station comprising:
   a monitoring unit for monitoring status of the object device to produce a status signal representative of the status of the object device; and
   a control unit, coupled to the monitoring unit, for responding to the base station through the radio channel on the basis of the status signal when the mobile station is called by the base station;
   Wherein the status signal indicates one or more of the following: whether the object device is in an active state, whether the object device is communicable with the mobile station, and whether the object device is connected to the mobile station.

26. A method of carrying out communication between a base station and a mobile station which is communicable with an object device, the method comprising the steps of:
   monitoring status of the object device to produce a status signal representative of the status of the object device; and
   responding to the base station through the radio channel on the basis of the status signal when the mobile station is called by the base station;
   Wherein the status signal indicates one or more of the following: whether the object device is in an active state, whether the object device is communicable with the mobile station, and whether the object device is connected to the mobile station.

27. A method as claimed in claim 26, wherein the responding step comprises the step of:
   receiving the status signal from the object device; and
   detecting the status of the object device to transmit the status of the object device to the base station.

28. A method as claimed in claim 26, the base station transmitting both a voice and an image to the mobile station in the form of voice and image data signal sequences, respectively, through the radio channel on calling the mobile station, wherein the responding step comprises the steps of:
   receiving the image data signal sequence from the base station;
   carrying out an operation determined for reception of the image data signal sequence; and
   informing the base station of the result of the operation.

29. A method as claimed in claim 28, wherein the object device is operable in response to the image data signal sequence.

30. A method as claimed in claim 26, further comprising the step of:
   transferring a data signal sequence from the mobile station to the object device.

31. A method as claimed in claim 30, wherein the mobile station is coupled to the object device through a radio channel.

32. A method as claimed in claim 28, wherein the informing step comprises the step of:
   transmitting, as the result of the operation, rejection of the response to the base station when detection is made in the monitoring step about the fact that the mobile station is not connected to the object device.

33. A method as claimed in claim 28, wherein the informing step comprises the step of:
   transmitting, as the result of the operation, admission of receiving only the voice to the base station.

34. A method as claimed in claim 28, wherein the informing step comprises the steps of:
   transmitting, to the base station, a holding response representative of a holding operation of the mobile station; and
   checking whether or not a connection is established between the mobile station and the object device in response to a request for the image data signal.

35. A method as claimed in claim 34, wherein the informing step further comprises the step of:
   transmitting, as the result of the operation, a response to reception of the image data signal when the connection is established between the mobile station and the object device.

36. A method as claimed in claim 34, wherein the informing step comprises the step of:
   transmitting, as the result of the operation, a rejection response representative of rejection of the response to the base station when the connection is not established between the mobile station and the object device.

37. A method as claimed in claim 34, wherein the informing step comprises the step of:
   transmitting, as the result of the operation, admission of receiving only the voice signal sequence when no connection is established between the mobile station and the object device.

38. A method as claimed in claim 26, wherein the responding step comprises the step of:
   transmitting a response for reception of an image data signal to the base station when the mobile station is connected to the object device in the monitoring step.

39. A method as claimed in claim 26, wherein the monitoring step comprises the step of:
   periodically storing status of the object device into a memory;
   the responding step comprising the steps of:
   periodically accessing the memory to read the status of the object device out of the memory; and
   transmitting, to the base station, a response determined by the status of the object device stored in the memory.

40. A method as claimed in claim 26, wherein the monitoring step comprises the step of:
   accessing the object device to detect the status of the object device each time when the mobile station receives a reception call.

41. A method as claimed in claim 26, wherein the responding step comprises the step of:
   transmitting, to the base station, a response for receiving a voice data signal when the mobile station receives a reception call for the voice data signal.

42. A method as claimed in claim 26, wherein the responding step comprises the step of:

switching from reception of either one of voice and image data signals to reception of another one.

43. A method as claimed in claim 42, wherein the responding step further comprises the step of:

detecting a species of either the voice or the image data signal.

44. A method as claimed in claim 43, wherein the detecting step is carried out by the use of the TEmID included in a control signal to judge whether the reception call is either a voice reception call or an image reception call.

45. A computer-readable storage medium for storing a program used in a mobile station which is communicable with an object device and for communication between a base station and mobile station, the program comprising the steps of:

monitoring status of an object device to produce a status signal representative of the status of the object device; and responding to the base station through the radio channel on the basis of the status signal when the mobile station is called by the base station;

Wherein the status signal indicates one or more of the following: whether the object device is in an active state, whether the object device is communicable with the mobile station, and whether the object device is connected to the mobile station.

46. A computer-readable storage medium as claimed in claim 45, wherein the responding step comprises the step of:

receiving the status signal from the object device; and detecting the status of the object device to transmit the status of the object device to the base station.

47. A computer-readable storage medium as claimed in claim 46, the base station transmitting both a voice and an image to the mobile station in the form of voice and image data signal sequences, respectively, through the radio channel on calling the mobile station, wherein the responding step comprises the steps of:

receiving the image data signal sequence from the base station;

carrying out an operation determined for reception of the image data signal sequence; and informing the base station of the result of the operation.

48. A computer-readable storage medium as claimed in claim 46, wherein the object device is operable in response to the image data signal sequence.

* * * * *